United States Patent [19]
Genevey

[11] 3,743,759
[45] July 3, 1973

[54] CRYOSTATIC CONTAINER

[76] Inventor: Pierre Genevey, 58a rue Pierre Brossolette, Chatillon-sous-Bagneux, France

[22] Filed: June 8, 1972

[21] Appl. No.: 260,990

[30] Foreign Application Priority Data

June 9, 1971 France..........................7120855

[52] U.S. Cl............ 174/15 R, 174/DIG. 6, 335/216
[51] Int. Cl................................................ H01v 11/00
[58] Field of Search................. 174/15 R, DIG. 6, 174/17 R, 17 LF; 335/216; 62/55.5

[56] References Cited
UNITED STATES PATENTS

| | | | |
|---|---|---|---|
| 3,187,235 | 6/1965 | Berlincourt | 174/DIG. 6 |
| 3,187,236 | 6/1965 | Leslie | 174/DIG. 6 |
| 3,210,610 | 10/1965 | Fraser | 174/DIG. 6 |
| 3,278,808 | 10/1966 | Bonfeld | 174/DIG. 6 |
| 3,296,825 | 1/1967 | Kanzig | 174/DIG. 6 |
| 3,349,161 | 10/1967 | Latham | 174/15 R |
| 3,578,541 | 5/1971 | Tariel | 174/DIG. 6 |

Primary Examiner—Bernard A. Gilheany
Assistant Examiner—A. T. Grimley
Attorney—William B. Kerkam, Jr.

[57] ABSTRACT

The container is intended for devices having a plurality of elements for low-temperature operation such as superconducting circuits comprising a coil, a flux pump, a switch and the like. The container comprises a set of separate cups in adjacent relation and each containing one element of the superconducting circuit, the cups are interconnected at the top by means of open channels providing passageways for the electric lead-wires between the elements and the set of cups is directly suspended within a double-walled outer enclosure.

7 Claims, 1 Drawing Figure

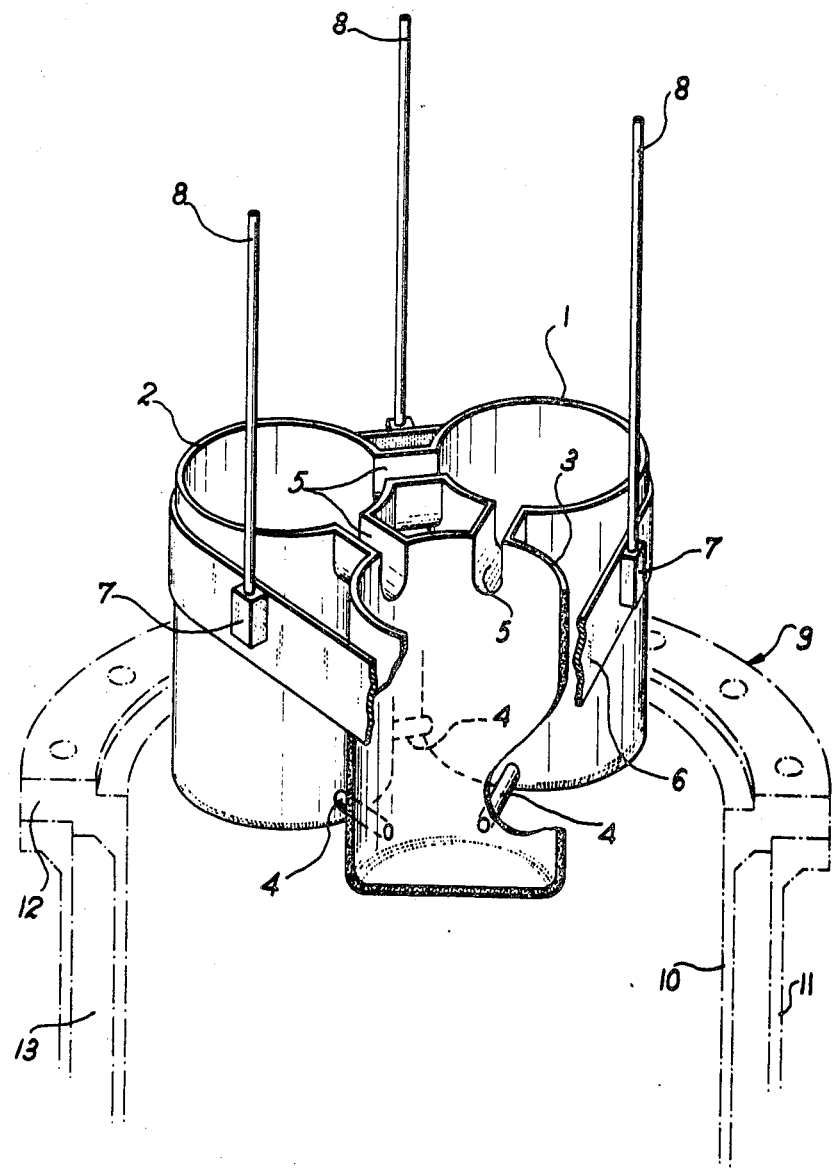

CRYOSTATIC CONTAINER

The present invention relates to a cryostatic container which is provided in particular with a plurality of zones of efficiency.

It is known that experiments relating to superconducting circuits and more particularly those concerned with storage of energy in circuits of this type call among other things for a solenoid or storage coil and in some cases for a charge device, especially of the flux pump type, for introducing into the superconducting coil a current which remains trapped therein and a switch for opening the circuit, for example in order to release the stored energy into an external load. The three circuit components, namely the coil, the flux pump and the switch are necessarily placed in a very-low-temperature medium in which the superconducting properties of the electric conductors constituting said components are exhibited; accordingly, these components are usually immersed in a bath of liquefied gas usually consisting of liquid helium and contained within a double-walled metallic enclosure which in turn contains another liquefied gas such as nitrogen, the dimensions of this enclosure being sufficient to accommodate all the elements mentioned above.

In an installation of this type, a number of disadvantages must nevertheless be taken into consideration, especially when the electric power consumption reaches a high level, with the notable result that the space requirements of the superconducting circuit are not negligible. There is a corresponding increase in the cost price of the installation when, all other things being equal, the volume of liquid helium and the diameter of the outer enclosure become of considerable value. Moreover, the direct contact of the liquid helium with the entire surface of the internal wall of the enclosure introduces cryogenic losses by conduction, thereby entailing high consumption of liquefied gas. Finally, the constructional design of the installation affords little flexibility and does not make it possible in particular to provide even partial heat insulation between the different elements of the circuit.

The aim of this invention is to provide a cryostatic container which overcomes the disadvantages outlined in the foregoing.

To this end, the container under consideration essentially comprises a set of adjacent but separate cups each containing one element of the superconducting circuit, said cups being interconnected by open channels located at the top portion of the cups and providing passageways for the electric connections which are necessary between said elements, the set of cups being directly suspended within the interior of a double-walled outer enclosure.

The constructional assembly of said cryostatic container by means of a plurality of separate cups containing a liquefied gas in which each circuit element is immersed separately makes it possible in particular to limit the volume of this liquefied gas while requiring only the exact quantity which is necessary to surround each element. Moreover, these cups eliminate any direct contact between the liquefied gas and the internal metallic wall of the outer enclosure, thereby eliminating practically all the cryogenic losses arising from the cryostat. In fact, the arrangement which is contemplated makes it possible to maintain the space formed between said cups and the metallic wall at an intermediate temperature between that of the liquefied gas, usually helium contained in the cups, and the temperature of another gas usually consisting of liquid nitrogen and contained within a closed space between the inner and outer walls of the enclosure, said walls being in turn made up of double walls and said space being filled with gaseous helium at a temperature which is higher than that of liquid helium, namely 4° K.

In accordance with a particular feature of the invention, the cups of the cryostatic containers are preferably formed of heat-insulating material. In particular, said insulating material can be formed of glass wool or fibers embedded in a hardened resin of the polyester or epoxy type.

In accordance with yet another characteristic feature, the cups are interconnected at the lower portions thereof by means of communication ducts permitting simultaneous filling of said cups with liquefied gas.

Finally and in a preferred embodiment of the invention, the cups of the cryostatic container are surrounded externally by a completely closed supporting strip to which are attached the extremities of vertical tie-rods designed to carry the cups which are filled with liquefied gas and suspended within the interior of the outer enclosure. The opposite extremities of the tie-rods are preferably connected to a cold portion of the circuit in order to eliminate cryogenic losses by conduction.

Further characteristic features of a cryostatic container as constructed in accordance with the invention will become apparent from the following description of one example of construction which is given by way of indication without any implied limitation, reference being made to the single FIGURE of the accompanying drawing in which the container aforesaid is illustrated in perspective and in partial cross-section.

As shown in this FIGURE, the cryostatic container under consideration is mainly composed of three cylindrical cups designated respectively by the references 1, 2 and 3, said cups being open at the top and closed at the bottom, an so arranged as to have parallel vertical axes. Said cups are preferably fabricated from heat-insulating material and especially from glass fibers agglomerated with a hardenable resin of the epoxy type and filled with a suitable volume of an appropriate liquefied gas, especially liquid helium, filling of said cups being carried out by any suitable means. The cups are connected to each other by means of communication ducts 4 located in the vicinity of their bottom end-walls so as to permit of simultaneous filling with liquefied gas. The diametrical dimension of each cup aforesaid is sufficient to contain a portion of a superconducting circuit (not illustrated) which is formed especially of a superconducting coil, of a device of the flux pump type for introducing an electric current into said coil, and finally a switch for opening the circuit, in particular in order to permit the release of stored electric energy into the coil. These three elements, the constructional detail of which is conventional and has no direct bearing on the invention, are housed separately within each of the above-mentioned cups 1, 2 and 3, the necessary electric lead-wires being placed within open channels 5 so as to establish a direct connection between each cup at the top portion thereof.

In addition, the assembly which is formed by the three cups is banded externally by means of a completely closed strip 6 which serves to support the cups by means of connecting lugs 7 to which are attached the lower extremities of vertical supporting tie-rods 8. These tie-rods make it possible in particular to suspend the assembly of cups and the elements of the superconducting circuit contained therein within the interior of an outer enclosure 9. Said enclosure is advantageously made up of two metallic double walls 10 and 11 in parallel relation and forming an internal space, the inner double wall 10 being fitted at the top portion thereof with a lateral cover which extends over the double wall 11 in such a manner as to ensure that these two walls form therebetween a closed space 13 in which is introduced a suitable volume of another liquefied gas and especially nitrogen.

The constructional design of the cryostatic container as hereinabove described offers a large number of advantages. In the first place, this design makes it possible to limit the quantity of helium solely to the exact quantity required in order to surround the different parts of the superconducting circuit and especially to avoid the use of a larger and unnecessary volume corresponding to that of the outer enclosure 9. Furthermore, by limiting the volume of helium solely to the effective locations, it is possible to reduce the cryogenic losses of the complete assembly; in particular, since the helium is no longer in direct contact with the inner metallic double wall 10 of the outer enclosure 9, the space formed between said double wall and the outer surface of the cups is always at an intermediate temperature between that of the liquid nitrogen contained between the double walls 10 and 11 in the region 13 and that of the liquid helium within the cups. As a general rule, this temperature corresponds substantially to that of the gaseous helium which evaporates from the cups and is therefore higher than 4° K. Finally, by securing the cups by means of the strip 6 and the tie-rods 8 in a cold portion of the superconducting circuit, this results in elimination of the greater part of the cryogenic losses which could otherwise take place by thermal conduction caused by the cryostat towards the external medium.

The cryostatic container which is contemplated affords a number of additional advantages which arise in particular from its flexibility of operation, the ease with which it is possible to modify the shape, number and distribution of the cups which are placed within the outer enclosure and finally which arise from its particularly low cost price. Moreover, by making use of adjacent but separate cups, the different elements of the superconducting circuit can be placed in regions in which their mutual induction is substantially zero; in particular, it is possible to minimize the coupling between the current storage coil and the current introduction device, that is to say the flux pump.

It is readily apparent that the invention is not limited solely to the example of construction which has been more especially described and illustrated but extends, on the contrary to all alternative forms.

What we claim is:

1. A cryostatic container for devices having a plurality of elements intended to operate at low temperature such as superconducting circuits comprising a coil, a flux pump, a switch and the like, wherein said container comprises a set of adjacent but separate cups each containing one element of the superconducting circuit, said cups being interconnected by means of open channels located at the top portion of the cups and providing passageways for the necessary electric connections between said elements, the set of cups being directly suspended within the interior of a double-walled outer enclosure.

2. A cryostatic container in accordance with claim 1, wherein the cups of the cryostatic container are formed of heat-insulating material.

3. A cryostatic container in accordance with claim 2, wherein the insulating material is formed of glass wool or glass fibers embedded in a hardened resin of the polyester or epoxy type.

4. A cryostatic container in accordance with claim 1, wherein the cups are interconnected at the lower portions thereof by means of communication ducts permitting simultaneous filling of said cups with liquefied gas.

5. A cryostatic container in accordance with claim 1, wherein the cups of the cryostatic container are surrounded externally by completely closed supporting strip to which are attached the extremities of vertical tie-rods designed to carry the cups which are filled with liquefied gas and suspended within the interior of the outer enclosure.

6. A cryostatic container in accordance with claim 5, wherein the opposite extremities of the tie-rods are connected to a cold portion of the circuit in order to eliminate cryogenic losses by conduction.

7. A cryostatic container in accordance with claim 1, substantially as hereinbefore described with reference to and as illustrated in the accompanying drawings.

* * * * *